United States Patent [19]

Marongiu

[11] Patent Number: 4,503,184
[45] Date of Patent: Mar. 5, 1985

[54] AQUEOUS DISPERSIONS OF SYNTHETIC RESINS, THEIR USE AS BINDERS IN ADHESIVE COMPOSITIONS, AND ADHESIVE COMPOSITIONS OBTAINED

[75] Inventor: Jacques Marongiu, Ivry, France

[73] Assignee: Rhone-Poulenc Specialities Chimiques, Courbevoie, France

[21] Appl. No.: 511,466

[22] Filed: Jul. 7, 1983

[30] Foreign Application Priority Data

Jul. 9, 1982 [FR] France ................................ 82 12067

[51] Int. Cl.$^3$ .............................................. C08L 27/00
[52] U.S. Cl. ...................................... 524/519; 524/45;
524/270; 524/272; 524/297; 524/414; 524/447;
524/476; 524/493; 524/515; 524/522; 524/523;
525/221
[58] Field of Search ............... 524/270, 272, 297, 515,
524/519, 522, 523, 788, 832, 833, 414, 442, 447,
492, 493, 474

[56] References Cited

U.S. PATENT DOCUMENTS 3,380,938  4/1968  Jack et al. ............................ 524/522
3,694,394  9/1972  Freeman ............................... 524/522
3,719,628  3/1973  Bergomi et al. ...................... 524/522
4,189,419  2/1980  Takemoto et al. ................... 524/522

FOREIGN PATENT DOCUMENTS 1242575  8/1971  United Kingdom .
1392614  4/1975  United Kingdom .

*Primary Examiner*—Joseph L. Schofer
*Assistant Examiner*—J. M. Reddick
*Attorney, Agent, or Firm*—Finnegan, Henderson, Farabow, Garrett & Dunner

[57] ABSTRACT

Aqueous dispersions containing a mixture of 20 to 80% by weight of a latex of a copolymer A of butadiene, styrene and at least one unsaturated carboxylic acid, and 80 to 20% by weight of latex of a copolymer B of styrene, an alkyl acrylate and, if appropriate, at least one unsaturated carboxylic acid. The dispersions can be used as binders for the preparation of adhesive compositions suitable for joining or gluing two or more elements, and particularly suitable when at least one of the elements consists of a material which is difficult to glue, such as polyvinyl chloride.

13 Claims, No Drawings

AQUEOUS DISPERSIONS OF SYNTHETIC RESINS, THEIR USE AS BINDERS IN ADHESIVE COMPOSITIONS, AND ADHESIVE COMPOSITIONS OBTAINED

The present invention relates to aqueous dispersions of mixtures of synthetic resins, to their use as binders in adhesive compositions suitable for joining or gluing two or more elements, and particularly suitable when at least one of the elements consists of a material which is difficult to glue, such as polyvinyl chloride, and also to the adhesive compositions obtained.

It is known that the joining or gluing of various materials such as textile fibers, imitation leather, cardboard and the like to a polyvinyl chloride substrate, or the gluing of coverings with a polyvinyl chloride backing onto a floor or wall, is particularly difficult. The commercial glues capable of solving this problem include particularly expensive adhesive compositions based on aqueous dispersions of acrylic acid ester polymers, as well as glues containing organic solvents, which raise health and safety problems because of the risk to the health of users who inhale the solvent vapors and because of the flammability of the organic solvents.

The inventor has developed aqueous dispersions of mixtures of synthetic resins which can be used as binders to ensure adhesion between any material and a material which is difficult to glue, such as vinyl chloride polymers or copolymers, without exhibiting the disadvantages mentioned above.

The present invention therefore relates, by way of new industrial products, to aqueous dispersions of mixtures of synthetic resins which can be used as binders in adhesive compositions.

According to the invention, the aqueous dispersions comprising a mixture of 20 to 80% by weight of a latex of a copolymer A of butadiene, styrene and at least one ethylenically unsaturated carboxylic acid, and 80 to 20% by weight of a latex of a copolymer B of styrene, an alkyl acrylate, in which the alkyl is $C_1$ to $C_8$, and, optionally, at least one ethylenically unsaturated carboxylic acid.

The copolymer A preferably comprises, by weight of solids in the latex of A, 40 to 70% of butadiene, 29 to 55% of styrene and 1 to 10% of at least one ethylenically unsaturated carboxylic acid, and more preferably, 45 to 58% of butadiene, 40 to 50% of styrene and 2 to 5% of at least one ethylenically unsaturated carboxylic acid.

The copolymer B preferably comprises, by weight of solids in the latex of B, 30 to 60% styrene, 40 to 70% of alkyl acrylate and 0 to 10% of at least one ethylenically unsaturated carboxylic acid, and more preferably, 35 to 45% of styrene, 50 to 60% of alkyl acrylate in which the alkyl is $C_2$ to $C_4$, and 1 to 5% of at least one ethylenically unsaturated carboxylic acid.

Representative ethylenically unsaturated carboxylic acids forming part of the composition of the copolymer A and, optionally, of the copolymer B, include acrylic, methacrylic, crotonic, maleic, fumaric, itaconic, mesaconic and glutaconic acids and chlorinated derivatives of these acids, such as chloroacrylic, chloromethacrylic, chloromaleic, chlorofumaric and chloroitaconic acids, or a mixture of at least two of these acids.

According to a preferred embodiment of the invention, the aqueous dispersions consist essentially of a mixture of 40 to 60% by weight of the latex of copolymer A and 60 to 40% by weight of the latex of copolymer B.

Before being mixed, the latex of copolymer A and the latex of copolymer B each contain from 40 to 70%, preferably, from 50 to 60%, by weight of solids. The mixture of the latices of A and B contains from 40 to 70%, preferably, from 50 to 60%, by weight of solids.

The latex of copolymer A and the latex of copolymer B can be prepared by any of the aqueous emulsion polymerization processes.

Once the latices of A and B have been prepared, they are agitated together, at 10° to 80° C., preferably, between 20° and 30° C., and in the proportions indicated above.

The present invention also relates to the use of the aqueous dispersions described above as binders in adhesive compositions suitable for joining or gluing two or more elements, at least one of which consists of a material which is difficult to glue. The present invention also relates to the adhesive compositions obtained, which are particularly advantageous for solving the problems of the adhesion of various materials to resins based on vinyl chloride polymers or copolymers.

The adhesive compositions forming the subject of the invention can be used in different types of application, for example:

for producing wall coverings by gluing a woven or non-woven decorative textile material to a cellular polyvinyl chloride backing (providing rigidity and sound insulation);

for manufacturing floor coverings by coating a polyvinyl chloride wearing layer with a mixture of the latices A and B containing a high proportion of filler, and then drying; and for manufacturing tufted carpets with a cellular polyvinyl chloride backing, by coating the back of the tufted carpet with a mixture of latices A and B containing a high proportion of filler, drying and then coating with cellular polyvinyl chloride.

In particular, the adhesive compositions are advantageous for manufacturing floor or wall coverings known under the name "embossed expanded vinyl" and obtained by coating or calendering polyvinyl chloride or vinyl chloride/vinyl acetate copolymer onto a fibrous substrate produced beforehand by a papermaking process, a melt process (spunbonded) or a textile process. The adhesive compositions according to the invention are extremely suitable for effecting adhesion between the two constituent parts.

The adhesive compositions according to the invention are also particularly suitable for gluing floor coverings having a vinyl chloride polymer or copolymer backing to a floor, such as a concrete floor.

The adhesive compositions of the present invention comprise, as the binder, the aqueous dispersion described above, i.e, comprising a mixture of the latices A and B, together with at least one of the customary adjuvants present in glue formulations. The weight ratio of adjuvants/solids in the binder is generally between 1/1 and 10/1.

The customary adjuvants are dispersing agents, protective colloids, plasticizers, coalescence agents, polar solvents, mineral fillers, crosslinking agents, thickeners and sticking agents. The nature and amounts of the adjuvants to be used depend on the particular application envisaged and can be determined by one of ordinary skill in the art without undue experimentation.

Mineral fillers include, in particular, kaolin, calcium carbonate, gypsum, silica and talc, taken separately or as a mixture of at least two of these compounds. The size of the filler particles is generally between 5 and 100 μm, the average particle diameter being less than 50 μm, preferably, from 5 to 15 μm.

Colophony is a customary sticking agent.

Representative dispersing agents include tetrasodium pyrophosphate, sodium hexametaphosphate and low molecular weight polyacrylates.

The plasticizers, coalescence agents, crosslinking agents thickeners, protective colloids, polar solvents and other customary adjuvants are chosen from amongst those normally used in glue formulation, and include butyl phthalate, dioctyl phthalate, white spirit, oil of turpentine, carboxymethylcellulose, alkali metal polyacrylates, glyoxal and phenol/formaldehyde resins.

The adhesive compositions for gluing floor coverings to concrete can advantageously contain, in particular: an amount of mineral fillers corresponding to a weight ratio of mineral fillers/solids in the binder of between 2/1 and 4/1; an amount of colophony corresponding to a weight ratio of colophony/binder of between 0.2/1 and 0.4/1; and, optionally, a minimal proportion of polar solvents, coalescence agent and plasticizer corresponding to a weight ratio of solvent+coalescence agent+plasticizer/solids in the binder of between 0.1/1 ad 0.3/1.

As physical properties, the adhesive compositions for gluing floor coverings to concrete advantageously have a pH of less than 8, preferably from 4 to 7 or very close to 7; a viscosity of 5,000 to 100,000 mPa.s, preferably 15,000 to 100,000 mPa.s and more preferably 15,000 to 60,000 mPa.s; and a solids content, measured according to French Standard Test Method T 51 054 (105° C., 2 hours) of up to 90%.

The following examples illustrate, but do not limit, the invention. In these examples, to evaluate the quality of the glue bond, a series of tests was carried out on floor coverings with backings made of different materials. The tests are conducted as follows:

(1) Peel strength test at 20° C. and at an angle of 180°:
The purpose of this test is to measure the strength of the glue bonds. A fibrocement base board of dimensions 7.5×20 cm, finished with a coating of ARDIT and containing the adjuvant IBO (these two registered trademarks identify products manufactured by Weber and Broutin-77170 SERVON, France), is dried for 24 hours at 20° C. Unless indicated otherwise, the remainder of the operations are carried out in a room conditioned at 20° C. and 65% relative humidity.

A serrated doctor blade (model from Weber and Broutin) is used to coat five fibrocement base boards with 350–400 g/m$^2$ of the glue to be tested. After 2 minutes, the five base boards and five identical samples of floor covering, cut lengthwise into strips to give 5×45 cm test pieces and coated, using the serrated doctor blade, with glue over an area of (5×15) cm$^2$, are placed together simultaneously. These five assemblies are immediately stacked together and a pressure of 25 g/cm$^2$ is applied for 10 minutes to the surface of the top test piece of the stack.

The measurement of the peel strength of the glue joint at an angle of 180° is carried out by means of a tensile tester with jaws moving at a speed of 100 mm/minute.

The peel forces are measured on:

five test pieces glued to the five base boards, as described above, and conditioned for seven days at 20° C. and 65% relative humidity; and five other test pieces glued to five base boards also as described above, conditioned for seven days at 20° C. and 65% relative humidity, then for five days at 55° C. in a dry oven, and finally for one day at 20° C. and 65% relative humidity. The results are expressed as daN/5 cm.

(2) Determination of the sticking power (or grab)

This is a method used in the art, which consists of producing a glue bond between a defined substrate and a defined covering, a so-called "cloth backing" board being applied to the covering in a given manner, before and after this covering has been placed on the said substrate coated with the glue to be tested.

The procedure is as follows: a fibrocement base board of dimensions 7.5×20 cm, finished with ARDIT and containing the adjuvant IBO (these two registered trademarks identify products manufactured by Weber and Broutin, 77170 SERVON, France), is dried for 24 hours at 20° C.

The remainder of the operations are carried out in a room conditioned at 20° C. and 65% relative humidity.

A serrated doctor blade is used to coat the fibrocement base board with 350–400 g/m$^2$ of the glue to be tested.

A sample of floor covering (identified by the registered trademark BICONFORT and manufactured by SOMMER S. A.-92200 NEUILLY, France) with a backing consisting of a mat of nonwoven polyester prepared by an adhesive melt process is cut lengthwise into an 80×100 mm test piece. This test piece is folded widthwise into two, in the middle, with outer face against outer face. Using a cloth backing board weighted with 2 kg of lead and having dimensions of 80×100 mm and a thickness of 20 mm, the fold in the covering test piece is crushed for 5 minutes.

Five minutes after the deposition of glue on the fibrocement base board, the unfolded covering test piece is applied.

The cloth backing board is then applied to this test piece for 10 seconds. If, in the next 20 seconds, the test piece is seen to lift up, the application of the cloth backing board to the test piece is repeated for 10 seconds and it is observed again whether the sample lifts up. These two operations are repeated at most ten times.

Other applications of floor covering test pieces are carried out under the same conditions, with waiting times before gluing being spaced apart by intervals of five minutes up to a maximum of 60 minutes.

The number of times which the covering test piece lifts up is noted for a given waiting time before gluing. The sticking power is poor if the covering test piece lifts up 5 times: it is assigned a mark of 5. If the covering test piece lifts up 10 times, it is assigned a mark of 0. A good sticking power corresponds to a number of lifts of 0 to 3, with 0 receiving a mark of 10 and 3 a mark of 7.

(3) Gumming Time

During the test for measurement of sticking power, it is noted that, after a certain waiting time between the application of the glue and the production of the glue bond, the sticking power reaches a constant maximum throughout the working time. This waiting time represents the value of the gumming time, which is, therefore, the interval of time elapsing between the moment when the glue is deposited and the moment when the sticking power is considered satisfactory.

(4) Open Time

The sticking power test is continued until there is no further visible transfer of the film of glue onto the backing of the covering test piece. One observes the time it takes for the glue to satisfactorily wet the backing of the covering test piece and obtain a good glue bond. The following marks are adopted for this purpose:

5 corresponds to wetting the whole surface of the backing of the test piece, 4 corresponds to wetting three-quarters of the surface of the backing of the test piece, 3 corresponds to wetting half the surface of the backing of the test piece, 2 corresponds to wetting a quarter of the surface of the backing of the test piece, 1 corresponds to wetting only a few places on the surface of the backing of the test piece, and 0 corresponds to zero wetting.

In practice, the open time of the glue will be the time corresponding to the assignment of the mark of 1.

(5) Working Time

This is the open time minus the gumming time.

(6) Determination of the solids content of the latices.

This is accomplished according to French Standard Test Method T 51 054.

(7) Determination of the Viscosity of the Glues The viscosity is measured by means of a Brookfield RVT instrument at 50 rpm.

EXAMPLE 1

A latex of copolymer A with a solids content of 50% is prepared by the polymerization of butadiene, styrene, fumaric acid and acrylic acid in aqueous emulsion, the copolymer being composed of 48% by weight of butadiene units, 48% by weight of styrene units, 2% by weight of fumaric acid units and 2% by weight of acrylic acid units.

A latex of copolymer B with a solids content of 50% is prepared by the polymerization of styrene, n-butyl acrylate and acrylic acid in aqueous emulsion, the copolymer being composed of 45% by weight of styrene units, 50% by weight of n-butyl acrylate units and 5% by weight of acrylic acid units.

60 parts by weight of the latex of copolymer A are mixed with 40 parts by weight of the latex of copolymer B, and the mixture is agitated to give a homogeneous composition.

This mixture is incorporated as a binder into the ingredients indicated below to prepare a floor covering glue having the following composition in parts by weight:

Mixture of latices of copolymer A and copolymer B with a solids content of 50%: 200
Silica (average particle diameter 40 μm): 200
Kaolin (average particle diameter about 2 μm): 50
Colophony: 56
White spirit: 14
Oil of turpentine: 10
Dioctyl Phthalate: 4
5% strength by weight solution of carboxymethylcellulose (marketed under the registered trademark Blanose R190 by NOVACEL): 2
10% strength by weight aqueous solution of sodium hexametaphosphate: 10

The weight ratio of colophony/latices = (56/200) = 0.28.

The weight ratio of white spirit + oil of turpentine + dioctyl phthalate/solids in binder = (28/100) = 0.28.

The weight ratio of mineral fillers/solids in binder = 250/100 = 2.5.

The viscosity of this glue, measured with a Brookfield RVT instrument at 50 rpm, is 29,600 mPa.s.

Various floor coverings with backings of different types were glued with the above glue. Table 1 summarizes the results of these gluing tests.

TABLE 1

| Nature of the backing of the floor covering | Peel strength test after drying for 7 days at 20° C., in daN/5 cm | Peel strength test after drying for 7 days at 20° C. and then for 5 days at 55° C. and 1 day at 20° C., in daN/5 cm |
| --- | --- | --- |
| Plasticized polyvinyl chloride *Taraflex "S" | 2.65 | 5.4 |
| Styrene/butadiene rubber foam | Peeling of the foam | Peeling of the foam |
| Polyurethane foam | Peeling of the foam | Peeling of the foam |
| Cellular polyvinyl chloride | 7.4 | 7.3 |
| Cellular polyvinyl chloride (another quality) | 15.75 | 14.5 |
| Felt | 9.5 | 15 |
| Felt (another quality) | 9.25 | 11.6 |
| Asbestos millboard | Peeling of the millboard | Peeling of the millboard |
| **Aiguellete Sommer S600 | 6.3 | 8.25 |

*Trademark Registered by B.A.T. (Tarare)
**Trademark registered by SOMMER

By way of comparison, gluing tests were carried out on a floor covering with a backing made of plasticized polyvinyl chloride (Taraflex "S" of Table 1), with glues of the same formulation as that indicated in Example 1, except that the mixture of latices of the copolymer A and copolymer B was replaced in one case by the same amount of Latex A by itself, and in the other case by the same amount of Latex B by itself.

Gluing was also tested with a glue of the same formulation, except that the mixture of latices A and B was replaced by a commercial poly-2-ethylhexyl acrylate latex having an initial glass transition temperature of −51° C.

Table 2 summarizes the results of the comparative tests.

TABLE 2

| | Nature of the aqueous dispersion | | | | | Peel strength test after drying for 7 days at 20° C. in daN/5 cm | Peel strength test after drying for 7 days at 20° C. and then for 5 days at 55° C. and 1 day at 20° C. in daN/5 cm |
| --- | --- | --- | --- | --- | --- | --- | --- |
| | Styrene | Butadiene | Fumaric acid | Acrylic acid | Buty acrylate | | |
| Co- poly- | 50 | 48 | 1 | 1 | — | 0.4 | 0.1 |
| | 48 | 48 | 2 | 2 | — | 0.2 | 0.1 |

TABLE 2-continued

| | Nature of the aqueous dispersion | | | | | Peel strength test after drying for 7 days at 20° C. in daN/5 cm | Peel strength test after drying for 7 days at 20° C. and then for 5 days at 55° C. and 1 day at 20° C. in daN/5 cm |
|---|---|---|---|---|---|---|---|
| | Styrene | Butadiene | Fumaric acid | Acrylic acid | Butyl acrylate | | |
| mer A | 50 | 48 | 1 | 1 | — | 0 | 0 |
| Co- | 45 | — | — | 5 | 50 | 0.4 | 0.3 |
| poly- | 36 | — | — | 4 | 60 | 0.5 | 0.3 |
| mer | 45 | — | — | 5 | 50 | 0.5 | 1.0 |
| B | 45 | — | — | 5 | 50 | 0.4 | 0.6 |
| 40/60 mixture of copolymer A + copolymer B, according to the invention | | | | | | 2.65 | 5.4 |
| Poly-2-ethylhexyl acrylate | | | | | | 2.0 | 1.4 |

The tests demonstrate that for a floor covering with a polyvinyl chloride backing, the binder mixture according to the invention makes it possible to obtain a glue bond having a peel strength considerably greater than that obtained with each of the constituent latices of the mixture used separately, or even with a glue based on poly 2-ethylhexyl acrylate.

EXAMPLE 2

The mixture of latices of Example 1 is used as a binder to prepare a floor covering glue having the following composition in parts by weight:
Mixture of latices of Example 1 with a solids content of 50%: 200
Ca carbonate (average particle diameter 5 μm): 200
Colophony: 56
Oil of Turpentine: 14
White spirit: 10
Dioctyl phthalate: 4
5% strength by weight solution of carboxymethylcellulose (marketed under the registered trademark Blanose R 190 by NOVACEL): 2.1
10% strength by weight aqueous solution of sodium hexametaphosphate: 10
Weight ratio of colophony/latices=(56/200)=0.28.
Weight ratio of white spirit+oil of turpentine+dioctyl phthalate/solids in binder=(28/100)=0.28.
Weight ratio of mineral filler/solids in binder=(200/100)=2.
Viscosity of the glue, measured with a Brookfield RVT instrument at 50 rpm=99,200 mPa.s.
This glue was used on a floor covering having a backing made of plasticized polyvinyl chloride (Taraflex "S" used in Example 1).
The results of peel strength tests are as follows:
Peel strength after drying for two days at 20° C., in daN/5 cm: 4.1
Peel strength after drying for seven days at 20° C. and then for five days at 55° C. and one day at 20° C., in daN/5 cm: 8.5

EXAMPLE 3

In the glue composition of Example 2, the 200 g of Ca carbonate particles having an average diameter of 5 μm were replaced by 250 g of particles having an average diameter of 10 μm.
The viscosity of the glue, measured as in Example 2, was 60,200 mPa.s.
Gluing tests were carried out with the floor covering of Example 2.
The peel strength after drying for seven days at 20° C. was 3.8 daN/5 cm.
The peel strength after drying for seven days at 20° C. and then for five days at 55° C. and one day at 20° C. was 6.7 daN/5 cm.

EXAMPLE 4

In the glue composition used in Example 3, only 0.7 part of the carboxymethylcellulose solution was incorporated, instead of 2 parts.
The viscosity of the glue, measured as in Example 3, was 19,200 mPa.s.
After gluing tests on the covering of the previous example, it was found that the peel strength was 3.45 daN/5 cm after drying for seven days at 20° C. and 4.4 daN/5 cm after drying for a further five days at 55° C. and one day at 20° C.
Other test results obtained included:
Gumming time in minutes: 5
Open time in minutes: 35
Working time in minutes: 30
Sticking power good up to: 35

EXAMPLE 5

In the preparation of the glue composition of Example 4, the carboxymethylcellulose was replaced by 0.7 g of sodium polyacrylate marketed by PROTEX under the registered trademark Acrylron A 300.
The viscosity of the glue, measured as in Example 4, was 23,200 mPa.s.
The covering of Example 4 was subjected to gluing tests and the following results were obtained:
Peel strength after drying for seven days at 20° C.: 3.35 daN/5 cm
and after further drying for seven days at 55° C. and one day at 20° C.: 5.6 daN/5 cm
Gumming time in minutes: 5
Open time in minutes: 25
Working time in minutes: 20
Sticking power good up to: 20 minutes

EXAMPLE 6

The glue composition of Example 3 was used again but water was added to bring its viscosity to 52,000 mPa.s.
The same gluing tests on the same covering as that of Example 3 gave the following results:
Peel strength after drying for seven days at 20° C.: 3.4 daN/5 cm
and after further drying for five days at 55° C. and one day at 20° C.: 6 daN/5 cm
Gumming time in minutes: 5
Open time in minutes: 20
Working time in minutes: 15

Sticking power good up to: 15 minutes

What is claimed is:

1. An aqueous dispersion of synthetic resins comprising a mixture of 20 to 80% by weight of a latex of a copolymer A of butadiene, styrene and at least one ethylenically unsaturated carboxylic acid, and 80 to 20% by weight of a latex of a copolymer B consisting essentially of styrene and an alkyl acrylate having a $C_1$–$C_8$ alkyl radical.

2. The dispersion of claim 1 wherein said copolymer B further consists essentially of at least one ethylenically unsaturated carboxylic acid.

3. The dispersion of claim 1, wherein said copolymer A contains 40 to 70% by weight of butadiene, 29 to 55% by weight of styrene and 1 to 10% by weight of at least one ethylenically unsaturated carboxylic acid.

4. The dispersion of claim 3, wherein said copolymer contains 45 to 58% by weight of butadiene, 40 to 50% by weight of styrene and 2 to 5% by weight of ethylenically unsaturated carboxylic acid.

5. The dispersion of claim 1, wherein said copolymer B consists essentially of 30 to 60% by weight of styrene, 40 to 70% by weight of alkyl acrylate and 0 to 10% of at least one ethylenically unsaturated carboxylic acid.

6. The dispersion of claim 5, wherein said copolymer B consists essentially of 35 to 45% by weight of styrene, 50 to 60% by weight of alkyl acrylate and 1 to 5% by weight of ethylenically unsaturated carboxylic acid.

7. The dispersion of claim 1, wherein said alkyl acrylate has a $C_2$–$C_4$ alkyl radical.

8. The dispersion of claim 2, wherein said ethylenically unsaturated carboxylic acid is selected from the group consisting of acrylic acid, methacrylic acid, crotonic acid, maleic acid, fumaric acid, itaconic acid, mesaconic acid, glutaconic acid and a chlorinated derivative of any of said acids.

9. The dispersion of claim 1, wherein said ethylenically unsaturated carboxylic acid is selected from the group consisting of acrylic acid, methacrylic acid, crotonic acid, maleic acid, fumaric acid, itaconic acid, mesaconic acid, glutoconic acid and a chlorinated derivative of any of said acids.

10. The dispersion of claim 1 comprising a mixture of 40 to 60% by weight of a latex of copolymer A and 60 to 40% by weight of a latex of copolymer B.

11. The dispersion of claim 1 comprising from 40 to 70% of solids, wherein the latex of copolymer A contains from 40 to 70% of solids and wherein the latex of copolymer B contains from 40 to 70% of solids.

12. A binder for adhesive compositions, said binder comprising the dispersion of claim 1.

13. An adhesive composition comprising the aqueous dispersion of claim 1 and at least one adjuvant for glues, said adjuvant being present in said composition in a weight ratio of adjuvants/solids in said aqueous dispersion of between 1/1 and 10/1.

* * * * *